I. M. DE PEW.
TRUCK.
APPLICATION FILED JUNE 21, 1910.
1,006,364.
Patented Oct. 17, 1911.
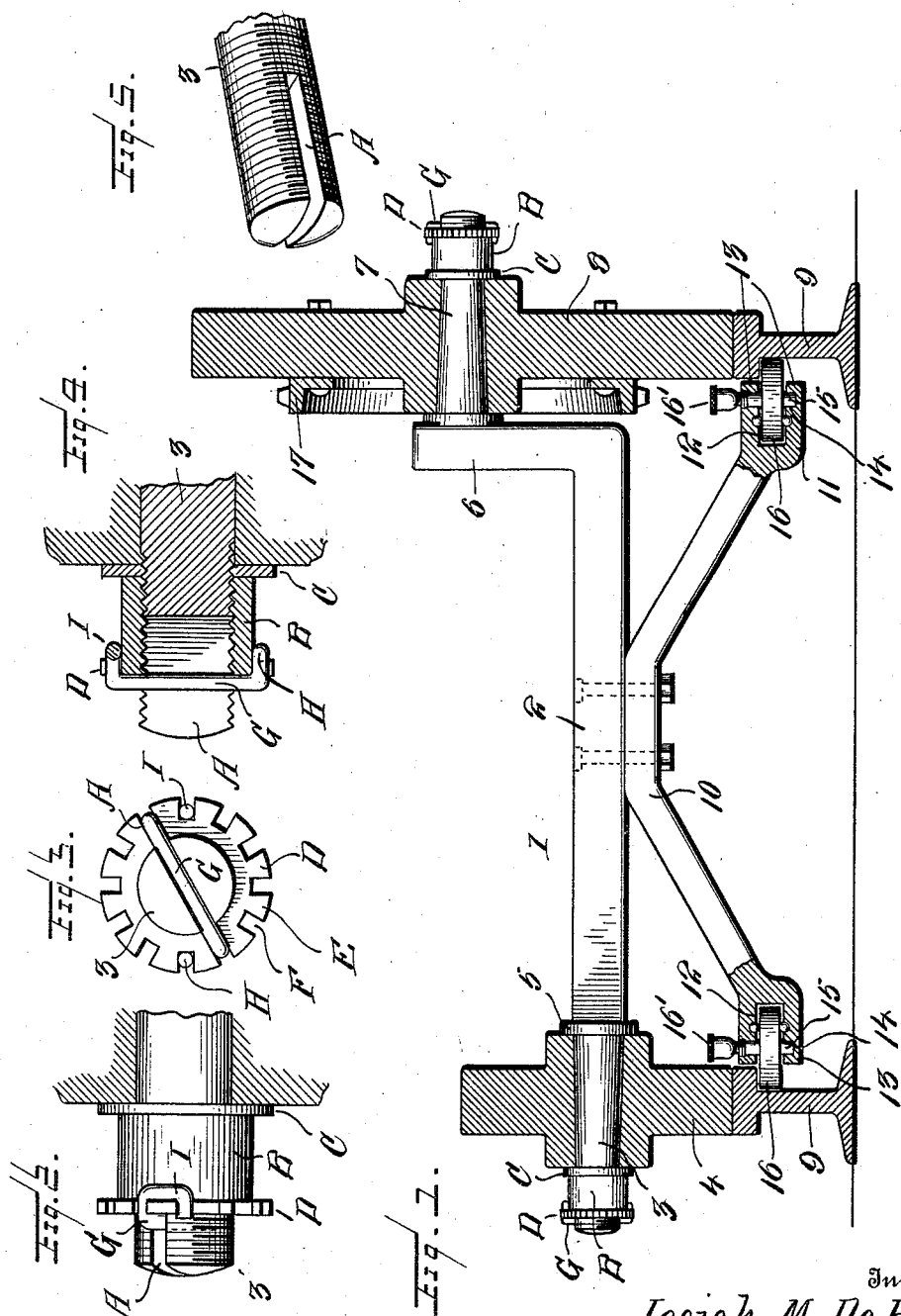

UNITED STATES PATENT OFFICE.

ISAIAH M. DE PEW, OF PALMA SOLA, FLORIDA.

TRUCK.

1,006,364. Specification of Letters Patent. Patented Oct. 17, 1911.

Application filed June 21, 1910. Serial No. 568,202.

*To all whom it may concern:*

Be it known that I, ISAIAH M. DE PEW, a citizen of the United States, residing at Palma Sola, in the county of Manatee and State of Florida, have invented new and useful Improvements in Trucks, of which the following is a specification.

This invention relates to railroad cars, and primarily to the running gear thereof, and the principal object of the invention is to provide a non-derailable truck which will entirely dispense with the flanges upon the car wheels and which provides novel and effective means for retaining the wheels upon the truck and the truck upon the track so that danger of the wheels becoming disconnected from the truck or the car leaving the track is entirely obviated, and at the same time the wear upon the heads of the rails due to the flanges of the wheels bearing thereon is practically obviated.

With the above, and other objects in view, which will appear as the description progresses, the invention resides in the novel construction and combination of parts hereinafter fully described and claimed.

In the accompanying drawings, Figure 1 is a front elevation of a truck constructed in accordance with the present invention, parts being shown in section. Fig. 2 is an end view of the spindle showing more clearly the method of retaining the nut upon the spindle, the hub of the wheel being shown in section. Fig. 3 is a front elevation of the spindle and securing bolt. Fig. 4 is a detail central longitudinal sectional view taken through the device illustrated in Fig. 2. Fig. 5 is a detail perspective view of the end of the spindle.

In the accompanying drawings the numeral 1 designates the main axle of the improved non-derailable car truck. The axle 1 comprises a horizontal member 2 provided at one of its ends with a spindle 3, which is adapted for the reception of a small wheel 4, the axle is further provided with an off-set portion, the purpose of which will presently be set forth. The spindle 3 adjacent its connection with the member 2 is provided with a collar 5, which is adapted to engage the inner face of the hub of the wheel 4, and the outer end of the spindle is slitted longitudinally as at A. The outer end of the spindle is threaded and adapted to receive a securing nut B which bears against a collar C, the latter contacting the outer face of the hub of the wheel 4. The nut B has its outer periphery enlarged to provide the cylindrical extension D. This cylinder D comprises a plurality of spaced members E, and the openings F between the said members E are adapted for the reception of a retaining pin G. This pin G is of a width equaling the width of the bifurcation or slot A in the threaded extremity of the spindle 3 and also equals the distance between the teeth E. The said pin is adapted to have its ends bent in opposite directions so that the same embrace the rear face of the collar D and have their extremities bent upwardly to occupy the spaces F adjacent the spaces occupied by the member G, as designated by the letters H and I, as clearly illustrated in Fig. 3 of the drawing. The opposite end of the horizontal member 2 is provided with a vertical upturned portion 6, and formed integrally with the said upturned portion adjacent the upper edge thereof is an outwardly extending spindle 7. This spindle 7 is of a structure similar to that described in connection with the spindle 3, the same having its ends slotted and adapted for the reception of the locking nut and retaining pin, as previously described. The spindle 7 is adapted for the reception of an enlarged wheel 8 and both of the wheels 4 and 8 are of a width slightly greater than the width of the heads of the rails 9.

The numeral 10 designates what may be termed a substantially V-shaped extension of the axle. This V-shaped extension is centrally secured to the axle 2, as clearly illustrated in Fig. 1 of the drawing. The extension 10 has its oppositely disposed arms provided with substantially horizontal offset portions and these offsets are bifurcated to provide a central cut-away portion 12 and the arms 13. The arms 13 are each provided with alining slots or openings 14, the same being adapted for the reception of axles 15 which are carried by horizontally arranged rollers 16. The rollers 16 are of a comparatively small diameter and are adapted to lie beneath the heads of the inner portions of the rails 9 and are positioned a slight distance below the said heads and adjacent the webs of the rails. The upper arms 13 of each of the bifurcated extensions of the member 10 are provided with suitable oil cups 16′, whereby a lubricant may be fed to the axles 15 of the rollers 16 so as to provide for the free rotation of the said rollers.

From the above description, taken in connection with the accompanying drawing, it will be noted that I have provided an extremely simple and thoroughly effective device for the purpose intended, one which cannot become disconnected from the rails, one which provides means whereby the wheels 4 and 8 cannot become detached from their spindles 3 and 7, one which greatly adds to the life of the rails by dispensing with the flanges upon the said wheels 4 and 8, and one which can be constructed at a comparatively small cost.

In order to apply the motor power directly to the wheel 8, the same has bolted or otherwise connected thereto a toothed or beveled friction wheel 17, the same being adapted for the reception of a suitable chain, or beveled friction wheel which is connected directly with the source of power.

The axle is constructed as above described in order that the car proper may rest low and also to concentrate its weight upon the horizontal portion 2 of the axle. The enlarged wheel 8 is spaced a suitable distance beyond the side of the car body and the concentration of the weight of the car body as well as the arrangement of the smaller wheel 4 in its relation to the larger wheel 8 permits of either of the said wheels acting as what may be termed a fulcrum upon which the opposite wheel turns while rounding curves.

Having thus fully described the invention, what I claim as new is:—

1. In a non-derailable truck, a horizontal axle having one of its ends formed with a reduced spindle, a wheel for this spindle, means for retaining the wheel upon the spindle, the opposite end of the axle having a vertical extension, a spindle upon this extension disposed above the spindle upon the axle, a wheel for this spindle, means for retaining the wheel upon this spindle, a sprocket or beveled friction wheel upon this wheel, the axle having its under face provided with a V-shaped member, said member having its opposite ends provided with horizontally arranged rollers having their perimeters disposed partially beneath both of the wheels of the axles, substantially as and for the purpose set forth.

2. In a non-derailable truck, the combination with a pair of railway rails, of a horizontally disposed axle, said axle having one of its ends provided with a spindle, a wheel upon the spindle adapted to bear upon one of the rails, means for preventing the accidental removal of the wheel from the spindle, the said axle having its end opposite that provided with the wheel formed with a vertical extension, the said extension being provided with an integrally formed angularly arranged spindle, a wheel for this spindle adapted to engage with the opposite rail, means for preventing the accidental removal of the wheel from the spindle, the axle being centrally provided with a V-shaped extension, the opposite ends of the said extension being formed with off-sets, the said off-sets being centrally bifurcated, the arms provided by said bifurcation having alining openings, a spindle for each of these openings, a roller for each of the spindles, and each of said rollers adapted to aline adjacent the web beneath the inner head portions of each of the axles.

In testimony whereof I affix my signature in presence of two witnesses.

ISAIAH M. DE PEW.

Witnesses:
Mrs. M. A. MORRIS,
J. J. STEWART.

---

Copies of this patent may be obtained for five cents each, by addressing the "Commissioner of Patents, Washington, D. C."